US012753655B2

(12) United States Patent
Zhu et al.

(10) Patent No.: US 12,753,655 B2
(45) Date of Patent: Oct. 6, 2026

(54) FOLDING LADDER

(71) Applicant: JIAXING JACKSON TRAVEL PRODUCTS CO., LTD, Jiaxing (CN)

(72) Inventors: Xuelin Zhu, Jiaxing (CN); Jing Li, Jiaxing (CN)

(73) Assignee: JIAXING JACKSON TRAVEL PRODUCTS CO., LTD, Jiaxing (CN)

( * ) Notice: Subject to any disclaimer, the term of this patent is extended or adjusted under 35 U.S.C. 154(b) by 340 days.

(21) Appl. No.: 18/544,392

(22) Filed: Dec. 18, 2023

(65) Prior Publication Data

US 2024/0125176 A1 Apr. 18, 2024

Related U.S. Application Data

(63) Continuation-in-part of application No. 16/180,769, filed on Nov. 5, 2018, now abandoned.

(30) Foreign Application Priority Data

Nov. 6, 2017 (CN) ........................ 201721461915.8

(51) Int. Cl.
*E06C 1/393* (2006.01)
*E06C 7/50* (2006.01)

(52) U.S. Cl.
CPC ................ *E06C 1/393* (2013.01); *E06C 7/50* (2013.01)

(58) Field of Classification Search
CPC . E06C 1/39; E06C 1/393; E06C 1/387; E06C 7/50
See application file for complete search history.

(56) References Cited

U.S. PATENT DOCUMENTS 3,161,923 A * 12/1964 Crain .................. E05B 65/0835 292/228
3,806,173 A * 4/1974 Sweda .................... E05B 83/10 292/DIG. 32
6,026,933 A * 2/2000 King ....................... E06C 1/393 182/161
6,220,478 B1 * 4/2001 Ingerson ................... E05C 3/14 224/404
6,427,805 B1 * 8/2002 Gibson ................... E06C 1/387 182/165
6,550,579 B2 * 4/2003 Gibson ................... E06C 1/387 182/161
6,892,860 B2 * 5/2005 Gibson ................... E04G 5/003 108/119

(Continued)

*Primary Examiner* — Colleen M Chavchavadze
(74) *Attorney, Agent, or Firm* — NZ Carr Law Office

(57) ABSTRACT

A folding ladder includes a front frame, a rear frame, a pedal, and a locking mechanism for locking the pedal. The front frame is rotatably connected with the rear frame, and the pedal is rotatably connected with the front frame. The locking mechanism includes a hook member, a snap portion capable of being engaged with the hook member, and a control member that controls the engagement and/or disengagement of the hook member and the snap portion. The snap portion is disposed at the pedal, and the hook member is fixed to the rear frame. The folding ladder further includes a first elastic member and a second elastic member. When the folding ladder is unfolded, the snap portion and the hook member are located under an upper surface of the pedal, the control member is vertically and movably disposed on the pedal.

3 Claims, 12 Drawing Sheets

(56) References Cited

U.S. PATENT DOCUMENTS

| | | | | |
|---|---|---|---|---|
| 6,902,035 | B2 * | 6/2005 | Baumgartner | E06C 1/393 182/165 |
| 7,849,967 | B2 * | 12/2010 | Gibson | E06C 1/393 182/25 |
| 8,002,084 | B2 * | 8/2011 | Huang | E06C 7/46 182/180.1 |
| 8,146,710 | B2 * | 4/2012 | Moldthan | E06C 1/393 182/180.1 |
| 8,684,139 | B2 * | 4/2014 | Leng | E06C 1/387 182/20 |
| 8,997,931 | B2 * | 4/2015 | Parker | E06C 1/387 182/180.1 |
| 2008/0142301 | A1 * | 6/2008 | Meyers | E06C 7/14 182/180.1 |
| 2011/0024234 | A1 * | 2/2011 | Lin | E06C 1/387 182/161 |

* cited by examiner

FOLDING LADDER

CROSS-REFERENCE TO RELATED APPLICATIONS

This application is a continuation-in-part to International Patent Application Ser. No. 16/180,769, filed on Nov. 5, 2018, which claims the priority benefit of Chinese Patent Application No. 201721461915.8, filed on Nov. 6, 2017. Each of these applications is incorporated by reference herein in its entirety.

BACKGROUND OF THE INVENTION

Field of the Invention

The present application relates to a folding ladder, and it belongs to the technical field of household products.

Description of the Related Art

The existing folding ladder comprises a frame with a front leg and a rear leg. The rear leg is coupled to the front leg, and the front and rear legs can be pivoted relative to each other between the opening position and the closing position. A pedal connected to the front leg is assembled, and the pedal can be relatively pivoted between the horizontal use position and the storage position; a connector is assembled, and the connector comprises a body and a shaft connected to the body and the pedal; a joint elbow connected to the body is assembled. When the joint elbow is trigged to engage with the rear leg and the pedal is moved from the horizontal use position to the storage position, the rear leg can move from the opening position to the closing position correspondingly. In the above technical solution, the connector is rotationally connected with respect to the pedal, and the structure necessarily requires a reset elastic member similar to torsion ring. The connection between the pedal and the rear leg needs to rely on the torsion spring, so the structure is complicated to assemble, with high manufacturing cost.

BRIEF SUMMARY OF THE INVENTION

It is an object of the present application to overcome the drawbacks of the prior art and provide a folding ladder with reasonable structural design and low production cost.

To achieve the above object, the present application adopts the following technical solution:

A folding ladder comprises a front frame, a rear frame, a pedal and a locking mechanism for locking the pedal, the front frame is rotatably connected with the rear frame, and the pedal is rotatably connected with the front frame. The locking mechanism includes a hook member, a snap portion capable of being engaged with the hook member, and a control member that controls the engagement and/or disengagement of the hook member and the snap portion. The snap portion is disposed at the pedal, and the hook member is fixed to the rear frame. The rear frame is provided with a crossbar and the pedal is capable of being flipped to the crossbar, and after the pedal is flipped to the crossbar, the locking mechanism locks the pedal. A part of the hook member extends out to form a driving rod, the folding ladder further comprises a first elastic member, when the control member moves toward the driving rod by overcoming resistance of the first elastic member, the control member exerts a force on the hook member, so that the hook member is disengaged from the snap portion, and then the first elastic member exerts a force on the control member to reset the control member. The folding ladder further comprises a second elastic member configured to keep the hook member in a locked state, and the second elastic member is connected to the hook member. When the folding ladder is unfolded, the snap portion and the hook member are located under an upper surface of the pedal, the control member is vertically and movably disposed on the pedal, and a press surface of the control member is parallel to the upper surface of the pedal, such that the control member is pressed to move vertically to release the hook member.

Optionally, the snap portion has a cavity or a boss or a rod.

Optionally, the folding ladder further comprises a hook mounting seat for mounting the hook member, the hook mounting seat is fixedly connected to the crossbar, and the hook member is connected with the hook mounting seat through a pin.

Further, the snap portion comprises a cavity having a narrow opening and wide inside, after the hook member is embedded in the cavity by overcoming its own elastic resistance, the hook member resets and the hook member is engaged with the snap portion, to lock the pedal, the control member controls the opening of the snap portion to become large, so that the snap portion and the hook member are disengaged.

Further, the snap portion comprises a cavity having a narrow opening and wide inside, after the hook member is embedded in the cavity by overcoming its own elastic resistance, the hook member resets and the hook member is engaged with the snap portion, to lock the pedal, the control member controls the hook member to disengage from the snap portion.

Still further, the periphery of the cavity comprises a semi-closed type, and the semi-closed type is a point-and-segment distribution structure of the outer wall of the cavity having a gap space.

Still further, the periphery of the cavity comprises a closed type or semi-closed type, and the closed type is a continuous closed structure of the outer wall of the cavity, and the semi-closed type is a point-and-segment distribution structure of the outer wall of the cavity having a gap space.

Still further, the folding ladder further comprises an elastic member, when the control member moves to the opening of the snap portion by overcoming the resistance of the elastic member, the opening becomes large, and the elastic member exerts a force on the control member to reset it.

Further, the folding ladder further comprises an elastic member, when the control member moves to the hook member by overcoming the resistance of the elastic member, the hook member tends to be disengaged from the snap portion, and the snap portion disengages from the hook member; the elastic member exerts a force on the control member to reset it.

Further, the hook member is an integrally formed plastic member.

Further, the hook member is made of elastic steel wire or steel plate.

Further, the barb is provided with a guide surface that caters to control with the control member.

Compared with the prior art, the present application has the following advantages and effects: first, when the pedal of the application is flipped to the crossbar, the locking mechanism can lock the pedal, so it needs not redundant operation for locking, just rotating the pedal. The operation is convenient and safe. The locking mechanism is arranged between the pedal and the crossbar, which dramatically reduces the materials and saves the manufacturing costs.

DETAILED DESCRIPTION OF THE INVENTION

Figure 1:
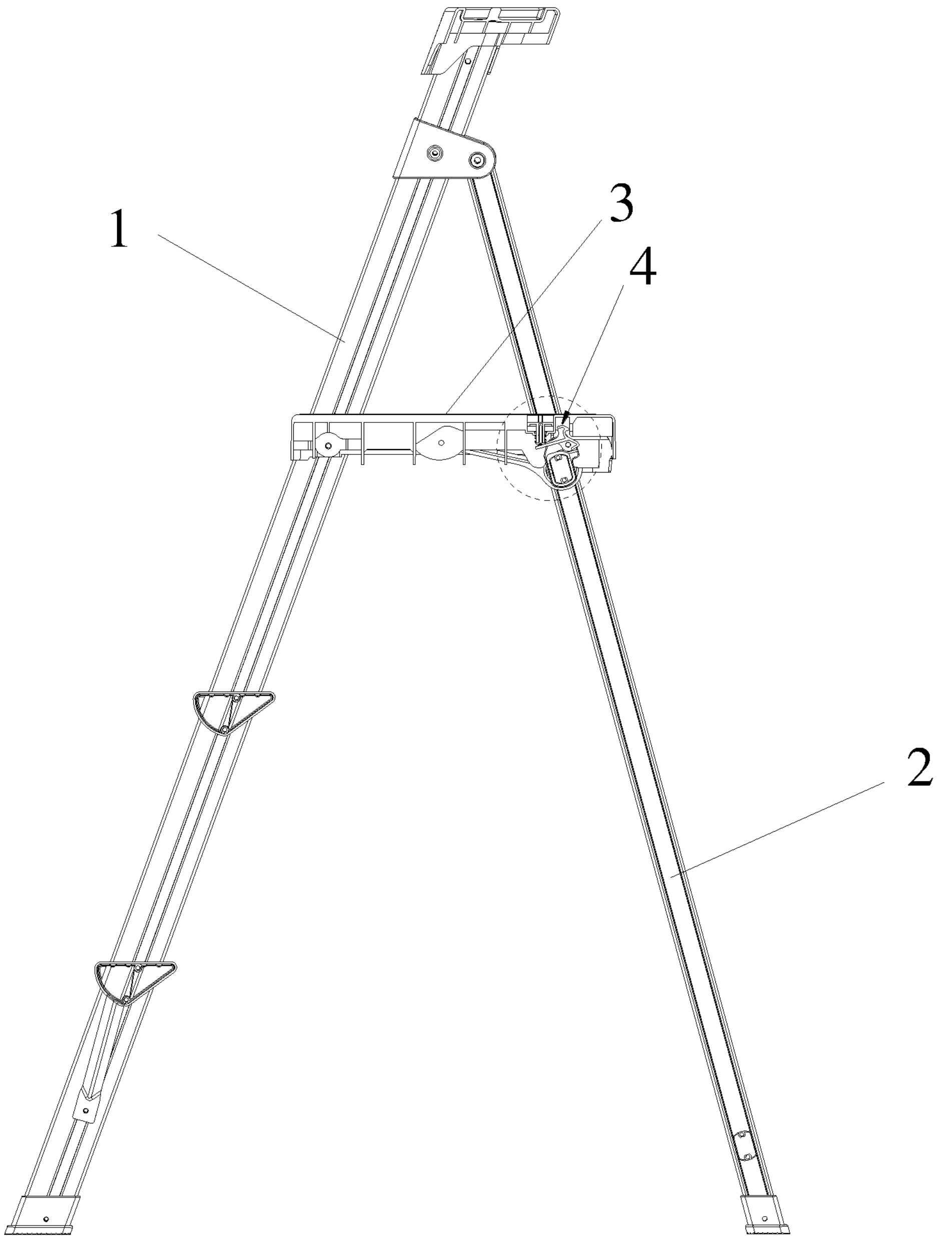
FIG. 1 is a section front view showing a folding ladder in an unfolded state when a control member of the folding ladder is pressed according to a first embodiment.
Figure 2:
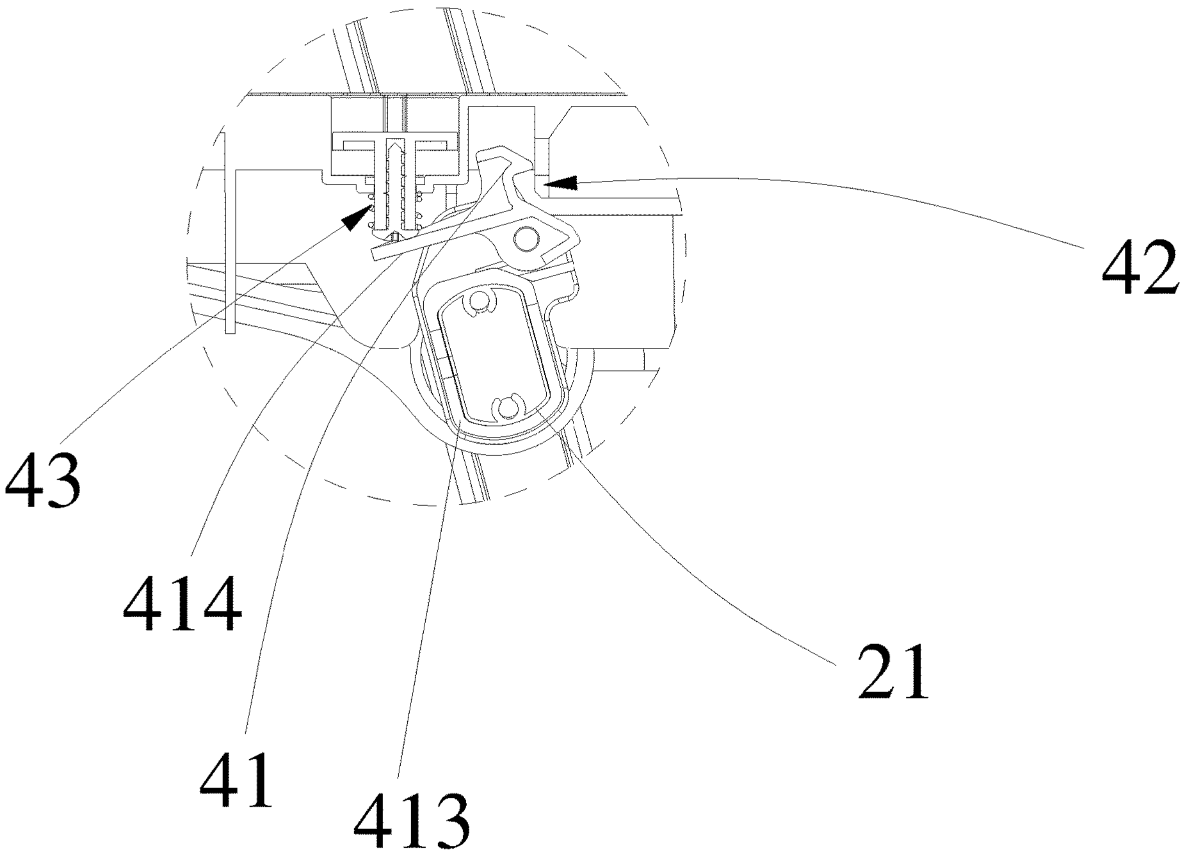
FIG. 2 is an enlarged diagram of the part marked in the dashed circle in FIG. 1.
Figure 3:
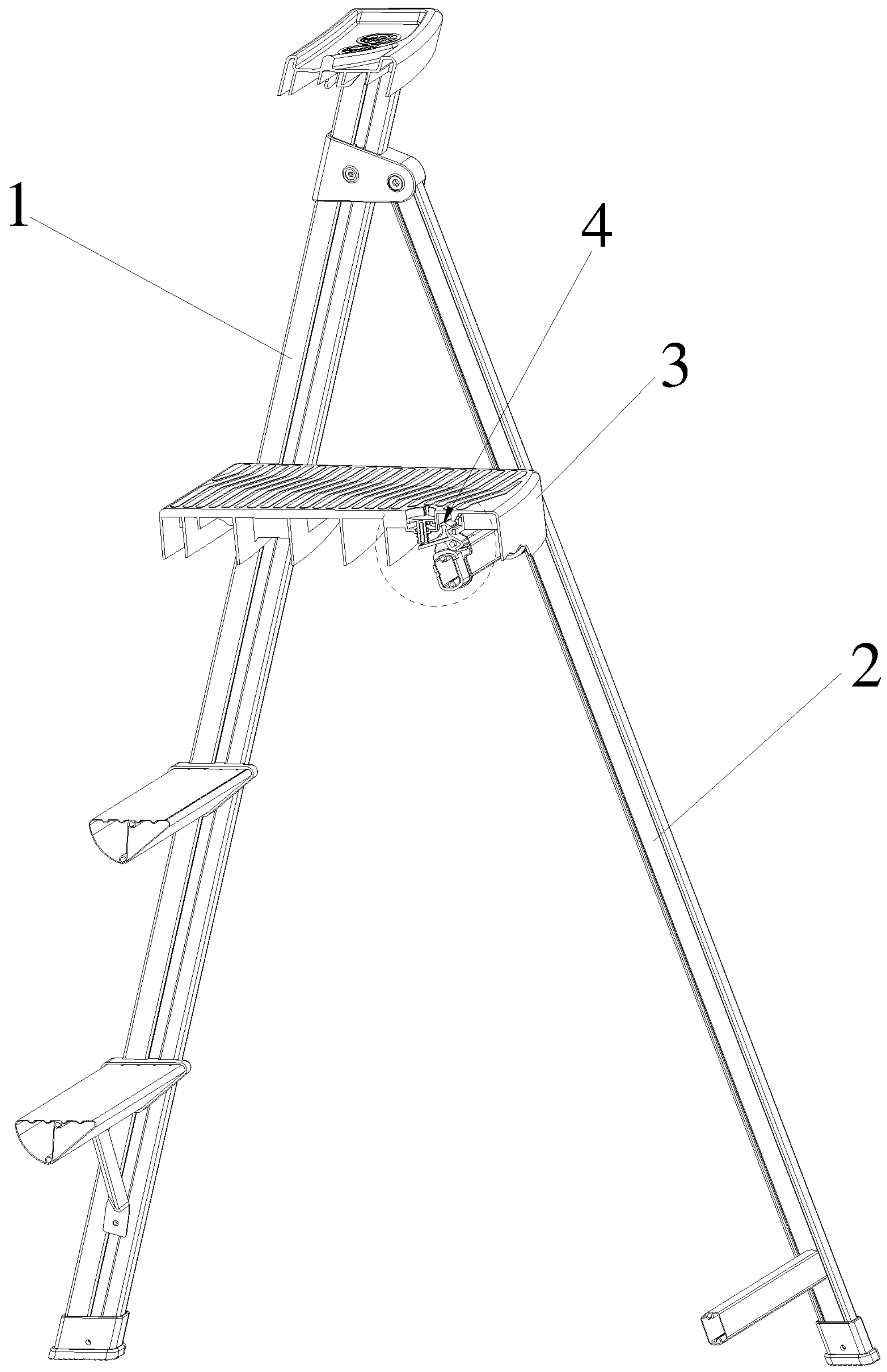
FIG. 3 is a section perspective view showing the folding ladder in the unfolded state when the control member of the folding ladder is pressed according to the first embodiment.

The present application will be further described in detail below with reference to the accompanying drawings and embodiments. The embodiments herein are illustrative but not restrictive to the present application.

Please refer to FIG. 1 to FIG. 6. A folding ladder in the first embodiment includes a front frame 1, a rear frame 2, a pedal 3 and, a locking mechanism 4 configured to lock the pedal 3 and prevent the pedal 3 from flipping.

The front frame 1 is rotatably connected with the rear frame 2, and the pedal 3 is rotatably connected with the front frame 1. The rear frame 2 is provided with a crossbar 21 and the pedal 3 can be flipped to the crossbar 21, and after the pedal 3 is flipped to the crossbar 21, the locking mechanism can lock the pedal 3.

Figure 4:
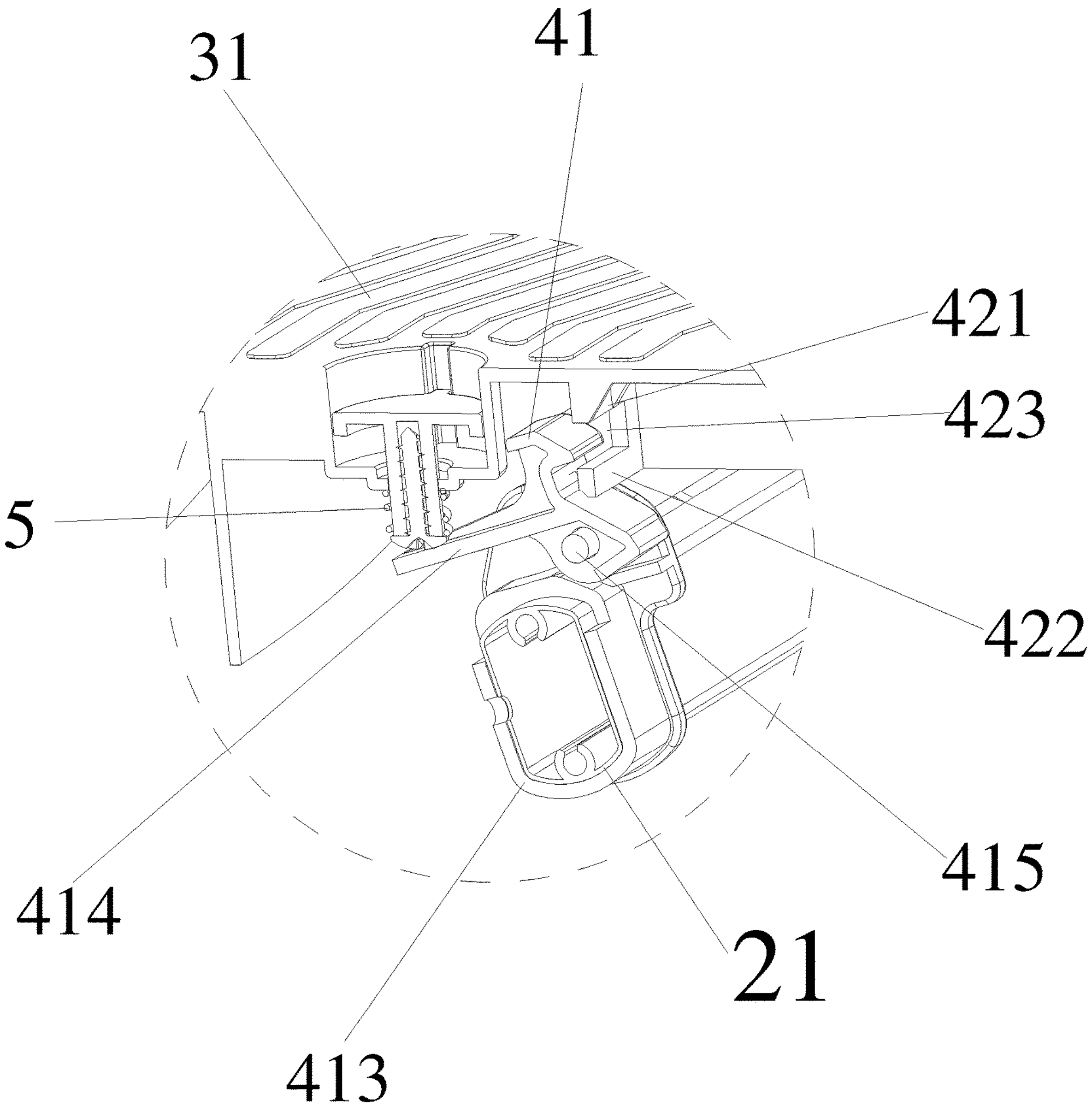
FIG. 4 is an enlarged diagram of the part marked in the dashed circle in FIG. 3.

The locking mechanism 4 includes a hook member 41, a snap portion 42 capable of being engaged with the hook member 41, and a control member 43 that controls the disengagement of the hook member 41 and the snap portion 42. The snap portion 42 is disposed at the pedal 3. As FIG. 4 shows, the pedal 3 has an upper surface 31 for a user stepping thereon, and the snap portion 42 is disposed under the upper surface 31 of the pedal 3. The snap portion 42 may have a cavity, a boss, or a rod. In the first embodiment, the snap portion 42 has a specific structure to provide a space for containing a part of the hook member 41. In detail, the snap portion 42 has an upper part 421 and a lower part 422, and a space 423 is defined between the upper part 421 and the lower part 422. When the hook member 41 is engaged with the snap portion 42, the bent part of the hook member 41 is located in the space 423 of the snap portion 42, and the lower surface of the bent part of the hook member 41 is against the upper surface of the lower part 422. When the hook member 41 is disengaged with the snap portion 42, the hook member 41 is rotated to be out of the space 423. However, the specific structure of the snap portion 42 is not limited in the application. In other embodiments, the snap portion may not have the upper part and may only have a cavity. In another embodiment, the snap portion may have a rod or boss as the lower part.

A part of the hook member 41 extends out to form a driving rod 414. In the embodiment, the driving rod 414 and the hook member 41 are integrally formed. In the first embodiment, the hook member 41 is fixed to the rear frame 2. In detail, the folding ladder includes a hook mounting seat 413, and the hook member 41 is mounted on the hook mounting seat 413, the hook mounting seat 413 is fixedly connected to the crossbar 21 of the rear frame 2, and the hook member 41 is connected with the hook mounting seat 413 through a pin 415. Thus, the hook member 41 is rotatably connected to the crossbar 21 of the rear frame 2, and the control member 43 can drive the hook member 41 to swing.

In the first embodiment, the folding ladder includes a first elastic member 5 and a second elastic member 51. The first elastic member 5 is configured to reset the control member 43, and the second elastic member 51 is connected to the hook member 41 and configured to keep the hook member 41 in a locked state.

The control member 43 has a press surface for the user's finger pressing thereon, and the control member 43 is vertically and movably disposed at the pedal 3. When a user wants to fold the folding ladder, the user exerts a force on the press surface of the control member 43. The control member 43 moves downward and toward the driving rod 414 by overcoming the resistance of the first elastic member 5. The control member 43 moves downward to touch one end (i.e. the left end in FIG. 2) of the driving rod 414, and the end of the driving rod 414 suffers a downward force and then moves downward. Since the driving rod 414 and the hook member 41 are a whole, the hook member 41 is rotated counterclockwise to be disengaged with the snap portion 42. After the hook member 41 is disengaged with the snap portion 42, the first elastic member 5 exerts a force on the control member 43 to reset the control member 5.

The second elastic member 51 may be an elastic steel piece, and the second elastic member 51 is connected to the hook member 41 at one end and connected to the crossbar 21 at the other end, and the hook member 41 can be reset elastically. During using, when the hook member 41 is engaged with the snap portion 42, the hook member 41 overcomes the resistance of the second elastic member 51, and after the hook member 41 is in place, the hook member 41 is engaged with the snap portion 42; the control member 43 can drive the hook member to swing back, and the hook member 41 is disengaged from the snap portion 42.

Figure 5:
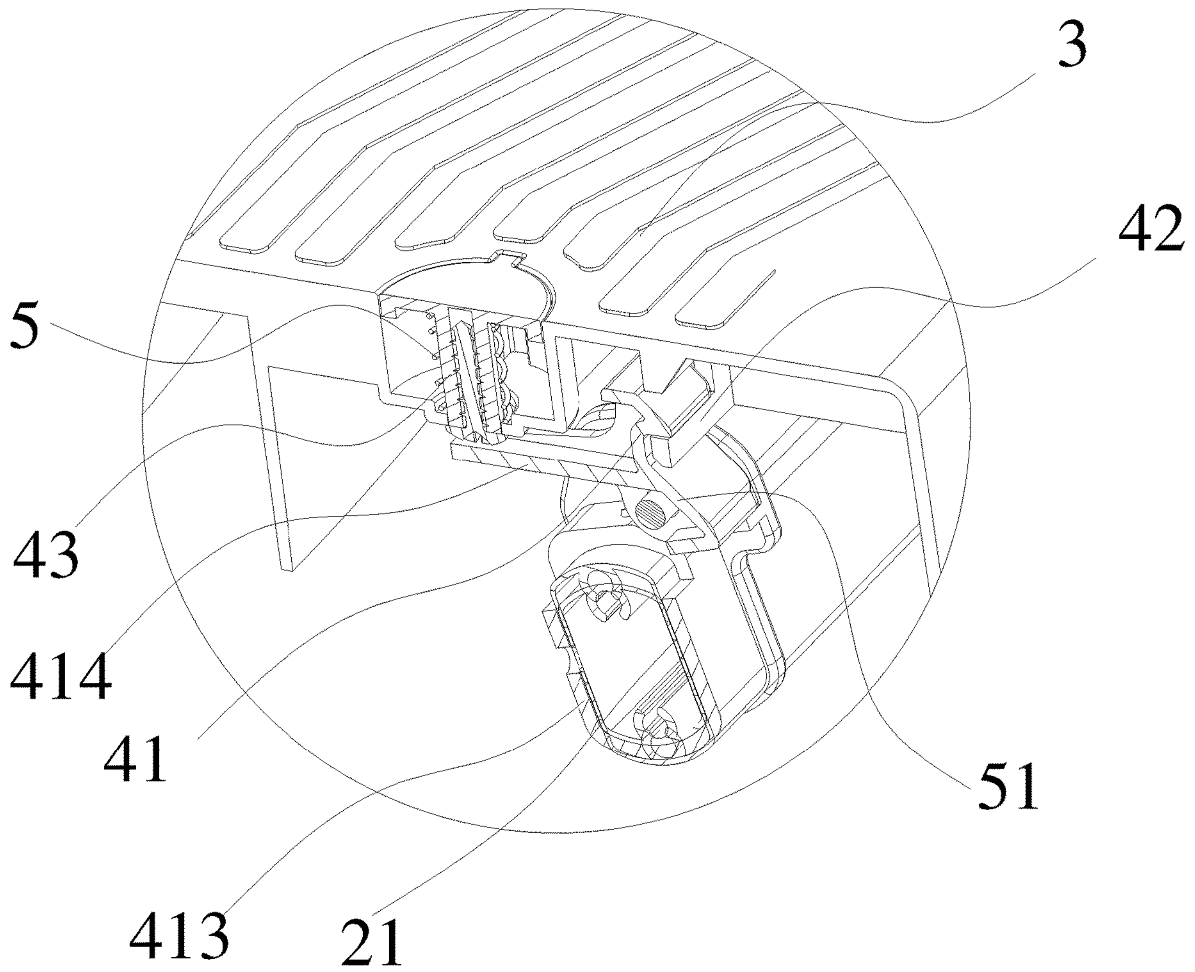
FIG. 5 is a section perspective view showing a control assembly of the folding ladder in an unfolded state according to the first embodiment.
Figure 6:
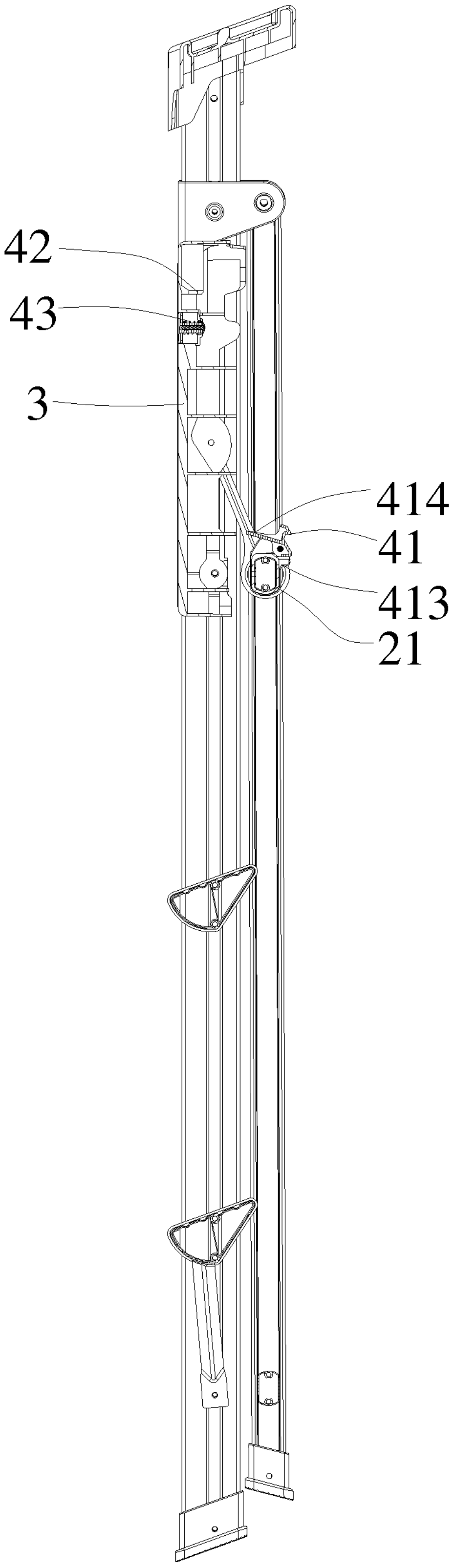
FIG. 6 is a section side view showing the folding ladder in a folded state according to the first embodiment.

As shown in FIG. 4 and FIG. 5, when the folding ladder is unfolded, the snap portion 42 and the hook member 41 are located directly under the upper surface 31 of the pedal 3. If the user wants to fold the ladder, the user presses on the press surface of the control member 43 and exerts a force downward to move the control member 43 downward. Then, the hook member 41 can be released from the snap portion 42 such that the ladder can be folded.

In the first embodiment, when the folding ladder is unfolded, the hook member 41 and the snap portion 42 are located directly under the upper surface 31 of the pedal 3, which means there is no need to leave gaps between the pedal and the front/rear frame when assembling these components. Due to this kind of structure, if the front/rear frame of the folding ladder provided in the first embodiment has the same width as that of the existing folding ladder in the prior art, the width of the pedal of the folding ladder provided in the first embodiment can be as large as possible, thereby improving the stability of the ladder and the safety of the user; and if the pedal of the folding ladder provided in the first embodiment has the same width as that of the existing folding ladder in the prior art, the width of the front/rear frame of our application can be as small as possible, thereby reducing the space occupied by the entire ladder thus to improve the convenience of storage and transportation of the entire ladder.

A shown in FIG. 5, in the first embodiment, the press surface of the control member 43 is parallel to the upper surface 31 of the pedal 3, and the control member 43 can be moved vertically. Thus, if the user wants to fold the ladder, the user just needs to use one finger of one hand to press the control member 43, and the lock state of the ladder can be unlocked. Therefore, the ladder can be folded conveniently and easily.

Figure 7:
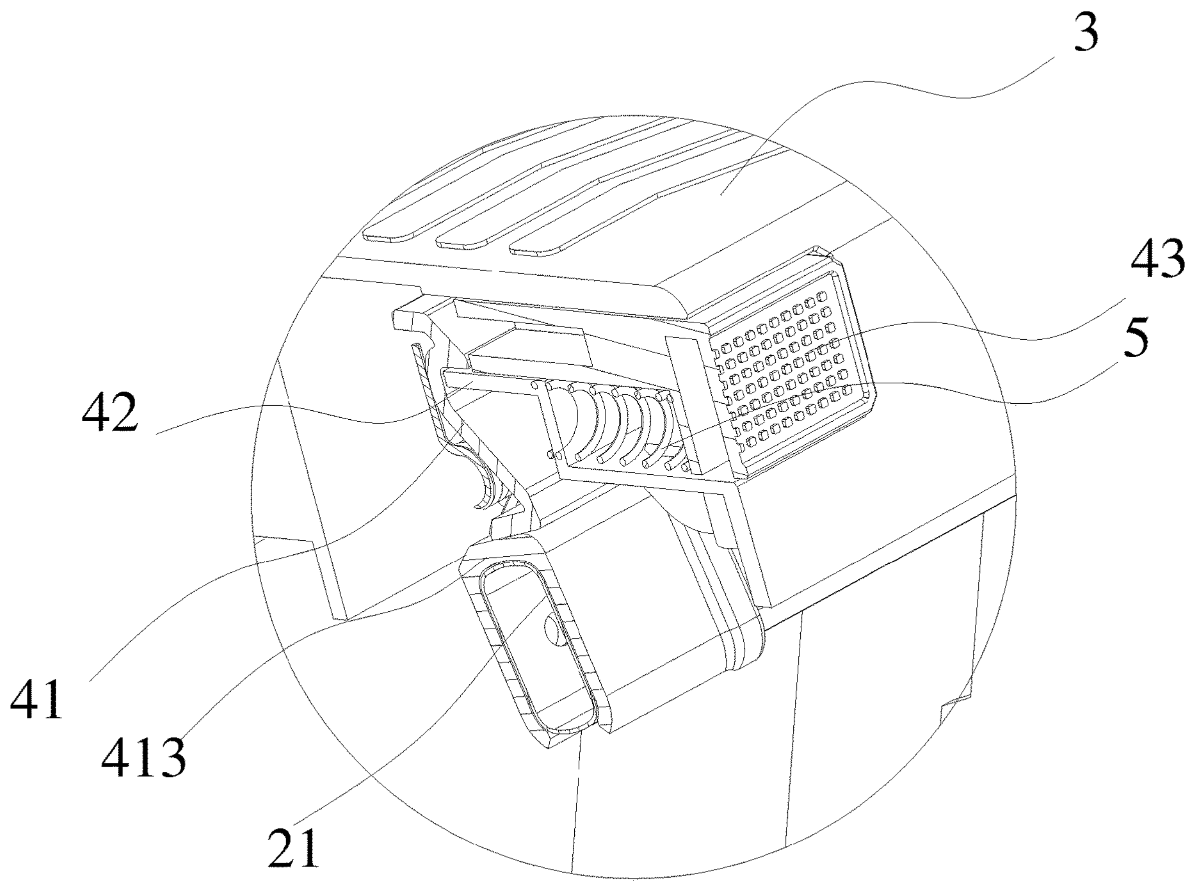
FIG. 7 is a section perspective view showing a control member of a folding ladder in a second embodiment.

FIG. 7 is a partial section diagram of the folding ladder in the second embodiment. In the second embodiment, the press surface of the control member 43 is vertical to the upper surface of the pedal 3. When the user wants to fold the folding ladder, the user can find the press surface on a side of the pedal 3 to press the control member 43 horizontally thus to disengage the hook member 41 and the snap portion 42. In detail, the control member 43 is horizontally and movably disposed at the pedal 3. The control member 43 overcomes the resistance of the elastic member 5 to touch the hook member 41, so that the hook member 41 swings to the disengagement position. When the control member 43 moves, the hook member 41 is pushed away.

Referring to FIG. 8 to FIG. 13, a folding ladder in the third embodiment includes a front frame 1, a rear frame 2, a pedal 3 and a locking mechanism for locking the flipping of pedal 3, the front frame 1 is rotatably connected with the rear frame 2, the pedal 3 is rotatably connected with the front frame 1, the rear frame 2 is provided with a crossbar 21 and the pedal 3 can be flipped to the crossbar 21, after the pedal 3 is flipped to the crossbar 21, the locking mechanism can lock the pedal 3. The locking mechanism comprises a hook member 41, a snap portion 42 that snaps the hook member 41, and a control member 43 that controls the disengagement of the hook member 41 and the snap portion 42; the hook member 41 is provided with a barb 411 that is engaged with the snap portion 42; the snap portion 42 is disposed on the pedal 3, and snap portion 42 may be a hole formed on the pedal 3, and the hole wall has a stepped structure, which greatly reduces the manufacturing cost, making snapping simple and reliable. The hook member 41 of the embodiment is disposed in the rear frame 2, and the rear frame 2 comprises a body of rear frame 2 and a derivative connector fixedly connected to the rear frame 2, and the derivative connector, for example, is a crossbar 21, and preferably, the hook member in this embodiment 41 is disposed on the crossbar 2 of the rear frame 2, and the hook member 41 corresponds to the position of the snap portion 42, and the pedal 3 can be engaged after being flipped appropriately. The operation is simple and the snapping is reliable.

In this embodiment, the mechanism that controls disengagement of the hook member 41 and the snap portion 42 includes a control member 43 that controls the hook member and a control member 43 that controls the snap portion 42.

Figure 8:
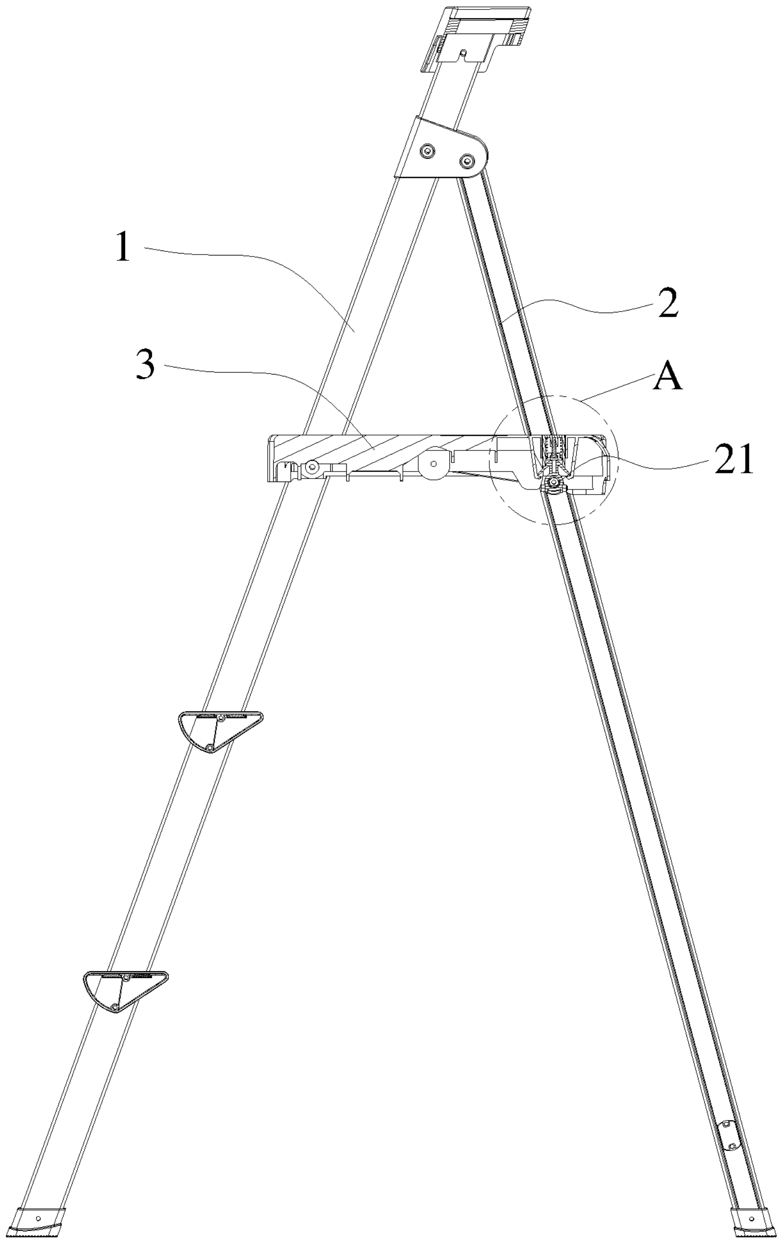
FIG. 8 is a section front view showing a folding ladder in an unfolded state according to a third embodiment.
Figure 9:
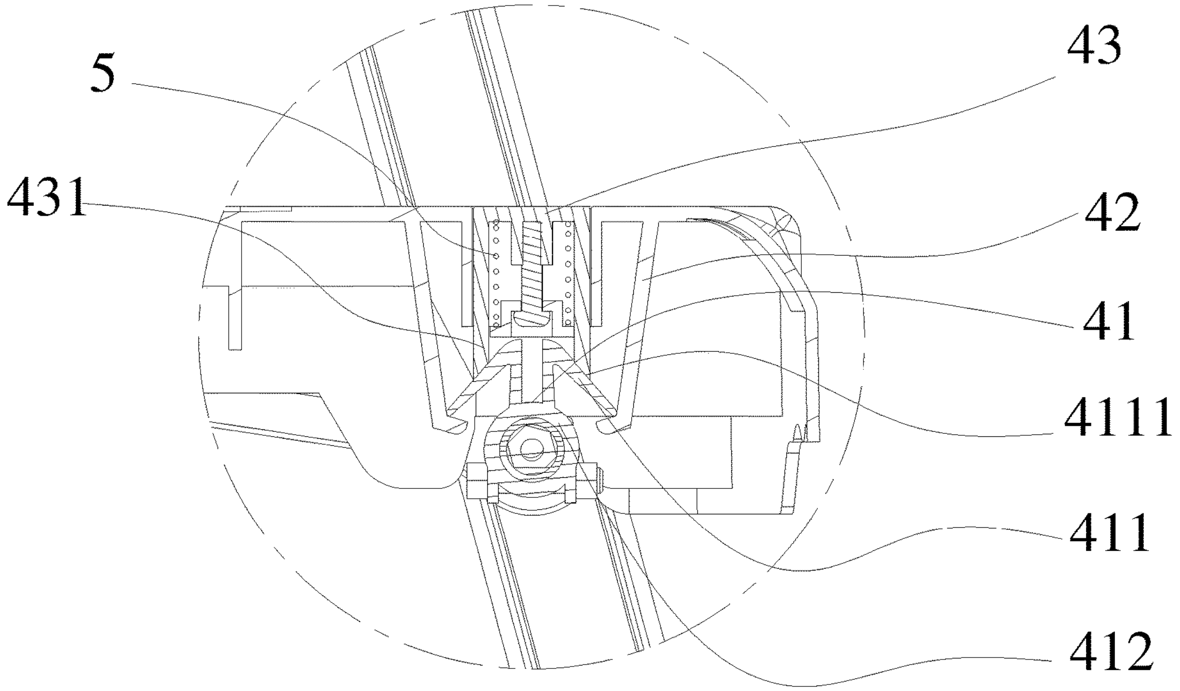
FIG. 9 is a partially enlarged schematic view showing the portion A of FIG. 8.
Figure 10:
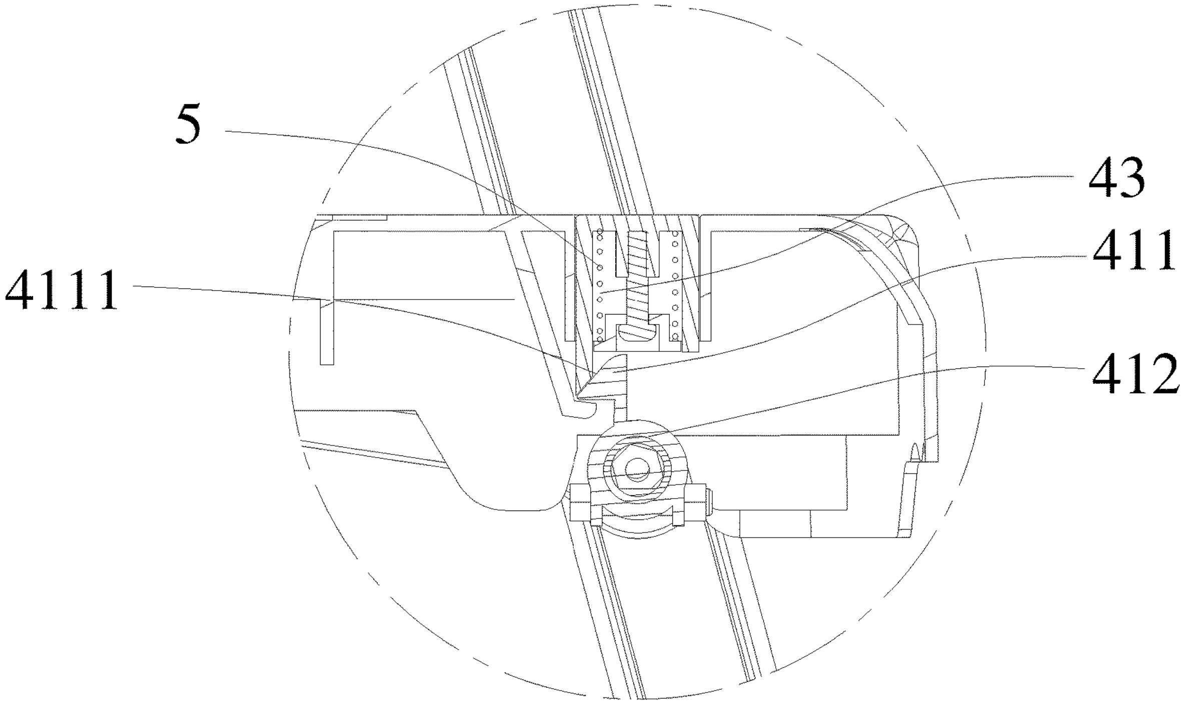
FIG. 10 is a schematic structural view showing a barb according to the third embodiment of the present application.

Referring to FIG. 8 to FIG. 10, in this embodiment, the method that the control member 43 controls the disengagement of hook member 41 is as follows: after the hook member 41 is embedded in the cavity by overcoming its own elastic resistance, the hook member 41 resets and the hook member 41 is engaged with the snap portion 42, to lock the pedal 3, the control member 43 controls the hook member 41 to disengage from the snap portion 42.

Further, the periphery of the cavity comprises a closed type, and the closed type is a continuous closed structure of the outer wall of the cavity, and the semi-closed type is a point-and-segment distribution structure of the outer wall of the cavity having a gap space. As the hook member 41 is a movable structure that can be deformed, the snap portion 42 of the closed type cavity structure is more beneficial to the stability of snapping.

Still further, the barb 411 is provided with a guide surface 4111 that caters to the snap-in or/and controls the disengagement with the control member 43. In this embodiment, preferably, the guide surface 4111 is a bevel. The barb 411 is provided with a guide surface 4111 that caters to the snap-in. During the engagement of the hook member 41 and the snap portion 42, the hook member 41 and the snap portion 42 are pushed each other, and the guide surface 4111 guides them to the engaged position.

The barb 411 of the embodiment is provided with a guide surface 4111 for engagement and controlling the disengagement with the control member 43. The engagement process is described as above and the disengagement process is as follows: The control member 43 comprises a top arm 431 corresponding to the guide surface 4111, and there is a free space between the top arms 431, and the top arm 431 is provided with a top arm slope corresponding to the guide surface 4111. In addition, it further comprises an elastic member 5. In this embodiment, preferably, the elastic member 5 is a spring, and when the control member 43 moves to the hook member 41 by overcoming the resistance of the elastic member 5, the control member 43 exerts a force on the hook member 41, so that the hook member 41 tends to be disengaged from the snap portion 42, and the snap portion 42 disengages from the hook member 41, and then the elastic member 5 exerts a force on the control member 43 to reset it.

As shown in FIG. 10, when there is one barb 411 and the control member 43 moves toward the hook member 41 by overcoming the resistance of the elastic member 5, the control member 43 exerts a force to the hook member 41, and the hook member 41 tends to be separated from the snap portion 42. When there are two or more barbs 411, it further comprises a base 412 connected to the barb 411. A gap space is provided between the plurality of barbs 411. When the control member 43 moves towards the hook member 41 by overcoming the resistance of the elastic member 5, the top arm 431 abuts against the guide surface 4111 on the barb 411, and the outer diameters of the plurality of barbs 411 are reduced, and the hook member 41 tends to be separated from the snap portion 42, and finally the snap portion 42 and the hook member 41 are disengaged. As shown in FIG. 9, the inside of the guide surface 4111 of the barb 411 has a free space, so the guide surface 4111 has a better elastic deformation effect, with high deformability.

Figure 11:
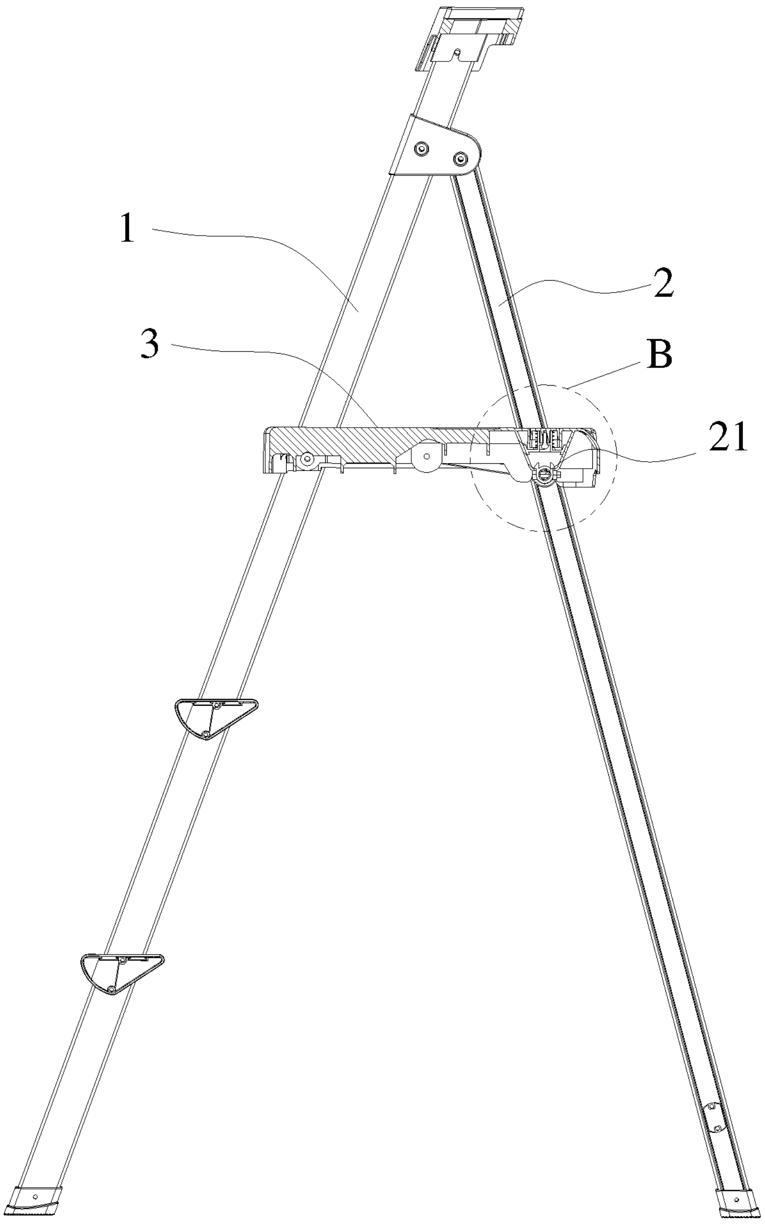
FIG. 11 is a schematic structural view showing that a control member controls a snap portion according to the third embodiment of the present application.
Figure 12:
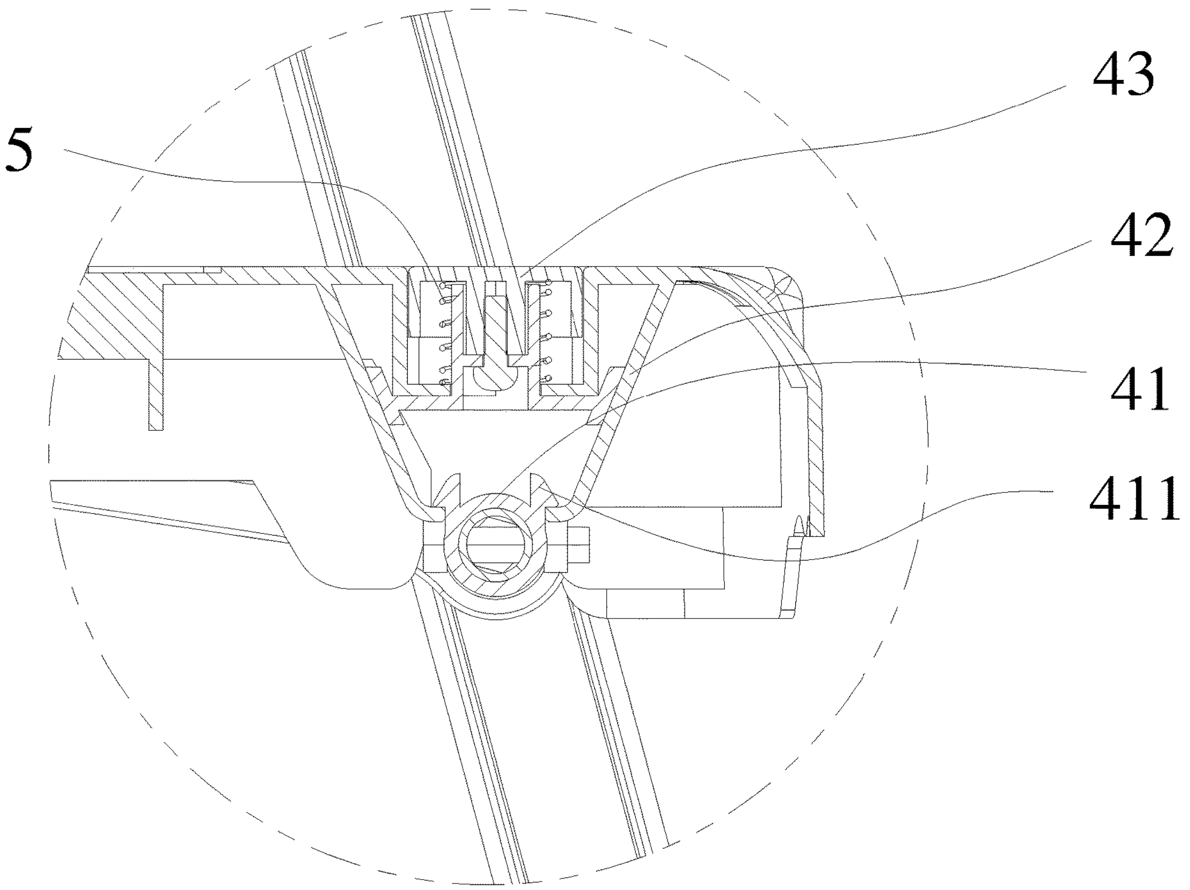
FIG. 12 is a partially enlarged schematic view showing the portion B of FIG. 11.

As shown in FIG. 11 to FIG. 12, the method that the control member 43 controls the disengagement of the snap portion 42 is as follows:

The snap portion 42 comprises a cavity having a narrow opening and wide inside. The structure having a narrow opening and wide inside comprises a structure formed by the guide surface 4111 or a hole in which the inner wall of the vertical opening is provided with a convex ring or a hole wall having a stepped mechanism. The periphery of the cavity comprises a closed type or semi-closed type, and the closed type is a continuous closed structure of the outer wall of the cavity, and the semi-closed type is a point-and-segment distribution structure of the outer wall of the cavity having a gap space. The snap portion 42 is disposed at pedal 3, and the hook member 41 is disposed at crossbar 21.

Figure 13:
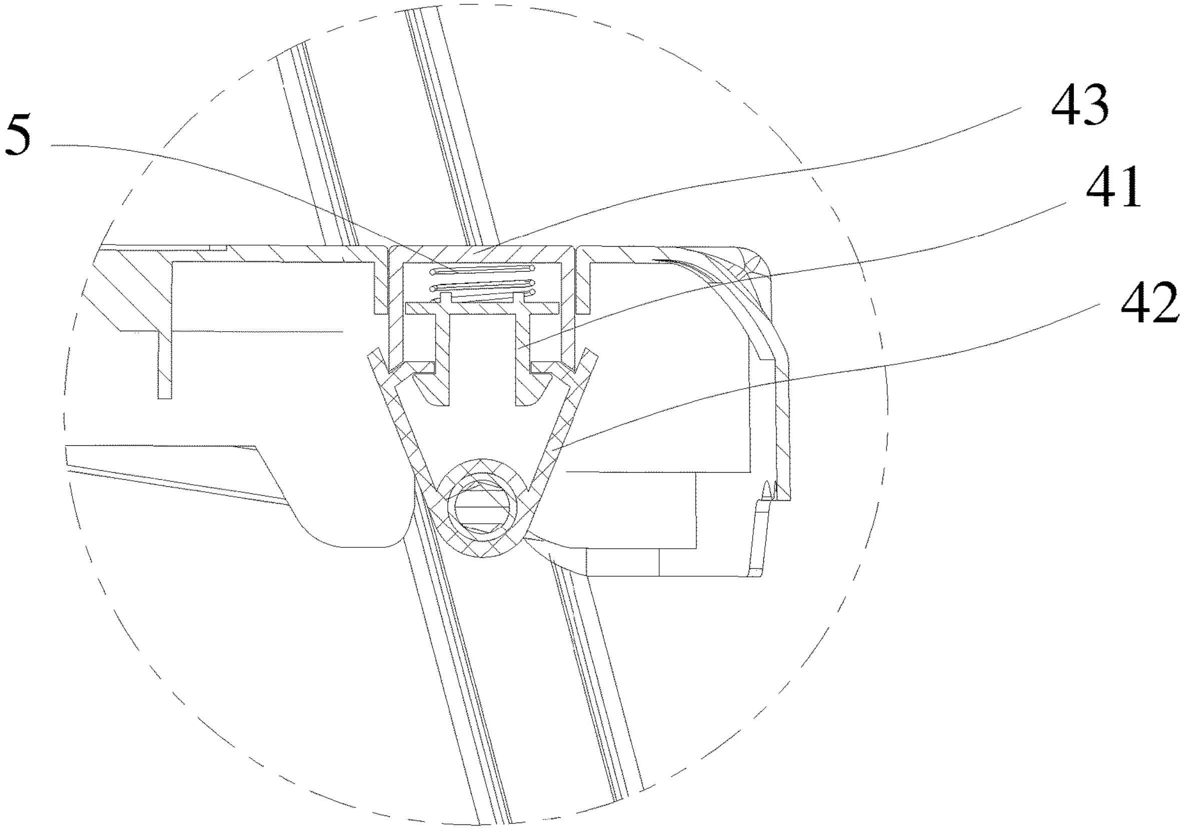
FIG. 13 is schematic structural view showing that the snap portion is disposed on the crossbar and the hook member is disposed on the pedal.

Still further, after the hook member 41 is embedded in the cavity by overcoming its own elastic resistance, the hook member 41 resets, the hook member 41 engages with the snap portion 42, to lock the pedal 3. As shown in FIG. 13, the control member 43 controls the opening of the snap portion 42 to become large, so that the snap portion 42 and the hook member 41 are disengaged. The snap portion 42 comprises a structure having a narrow opening and wide inside formed by the guide surface 4111, and further comprises an elastic member 5 for resetting the control member 43. When the control member 43 moves towards the opening of the snap portion 42 by overcoming the resistance of the elastic member 5, the control member 43 makes the opening to become large, so that the snap portion 42 and the hook member 41 are disengaged. Preferably, in the embodiment, the periphery of the cavity of the snap portion 42 is semi-closed type, and the semi-closed type is a point-and-segment distribution structure with a gap space. The semi-closed type cavity has an adjustable opening diameter, and by adjusting the diameter of the opening, the engagement or disengagement of the snap portion 42 and the hook member 41 is controlled. As shown in FIG. 5, the guide surface 4111 of the barb 411 of this embodiment does not have a free space, so the barb 411 has excellent stability and high mechanical strength.

The hook member 41 in this embodiment is an integrally formed plastic member.

The hook member 41 of this embodiment is made of elastic steel wire or steel plate. The elastic steel wire or steel plate is bent to form the barb 411 and/or the base 412.

The rotary connection in this embodiment is a conventional technical means, including pinning, hinging, riveting, etc.

Another embodiment of the snap portion 42 is that the snap portion 42 is a member that can be hooked securely to the hook member 41, and the member is configured as a cavity or a boss or a rod.

The foregoing descriptions herein are merely illustrative of the application. A person skilled in the art can make various modifications or additions to the specific embodiments described or replace them in a similar manner, as long as these modifications, additions or replacements do not deviate from the description or are beyond the scope of the claims of the present application, they shall fall within the scope of protection of the present application.

The invention claimed is:

1. A folding ladder, comprising:

a rear frame, a front frame, rotatably connected with the rear frame, a pedal, rotatably connected with the front frame; and a locking mechanism, comprising a hook member, a snap portion capable of being engaged with the hook member, and a control member that controls disengagement of the hook member and the snap portion, wherein the snap portion is disposed at the pedal, and the hook member is fixed to the rear frame;

wherein the rear frame is provided with a crossbar and the pedal is capable of being flipped to the crossbar, and after the pedal is flipped to the crossbar, the locking mechanism locks the pedal;

wherein a part of the hook member extends out to form a driving rod, the folding ladder further comprises a first elastic member, when the control member moves toward the driving rod by overcoming resistance of the first elastic member, the control member exerts a force on the hook member, so that the hook member is disengaged from the snap portion, and then the first elastic member exerts a force on the control member to reset the control member; and wherein the folding ladder further comprises a second elastic member configured to keep the hook member in a locked state, and the second elastic member is connected to the hook member; and wherein when the folding ladder is unfolded, the snap portion and the hook member are located under an upper surface of the pedal, the control member is vertically and movably disposed on the pedal, and a press surface of the control member is parallel to the upper surface of the pedal, such that the control member is pressed to move vertically to release the hook member.

2. The folding ladder according to claim 1, wherein the snap portion has a cavity or a boss or a rod.

3. The folding ladder according to claim 2, wherein the folding ladder further comprises a hook mounting seat for mounting the hook member, the hook mounting seat is fixedly connected to the crossbar, and the hook member is connected with the hook mounting seat through a pin.

* * * * *